United States Patent
Rudy

(10) Patent No.: US 11,470,831 B1
(45) Date of Patent: Oct. 18, 2022

(54) STAMP/WEB-MOUNTING FISHING TACKLE

(76) Inventor: Christopher John Rudy, Fort Gratiot Township, Saint Clair County, MI (US)

( * ) Notice: Subject to any disclaimer, the term of this patent is extended or adjusted under 35 U.S.C. 154(b) by 1413 days.

(21) Appl. No.: 10/360,681

(22) Filed: Feb. 7, 2003

Related U.S. Application Data

(60) Provisional application No. 60/355,031, filed on Feb. 8, 2002.

(51) Int. Cl.
*A01K 85/16* (2006.01)
*A01K 85/01* (2006.01)
*A01K 85/00* (2006.01)

(52) U.S. Cl.
CPC .......... *A01K 85/012* (2022.02); *A01K 85/011* (2022.02); *A01K 85/015* (2022.02); *A01K 85/017* (2022.02); *A01K 85/018* (2022.02); *A01K 85/029* (2022.02); *A01K 85/16* (2013.01)

(58) Field of Classification Search
CPC .... A01K 85/00; A01K 85/029; A01K 85/011; A01K 85/012; A01K 85/013; A01K 85/015; A01K 85/16; A01K 85/18; A01K 85/01; A01K 85/017; A01K 85/018
USPC ............. 43/42.09, 42.32, 42.33, 42.34, 17.6; 40/1.5, 1.6, 642.02, 649–651, 654.01, 40/660, 661, 661.05; 63/18, 19; 206/39, 206/775, 776, 39.1, 39.7
See application file for complete search history.

(56) References Cited

U.S. PATENT DOCUMENTS

| | | | | |
|---|---|---|---|---|
| 161,225 A * | 3/1875 | Hall | ................................ | 206/39 |
| 164,833 A * | 6/1875 | Hall | ................................ | 206/39 |
| 458,126 A * | 8/1891 | Goldbeck | ........................ | 206/39 |
| 475,400 A * | 5/1892 | Houghton et al. | ............... | 40/660 |
| 1,211,681 A * | 1/1917 | Currie | ............................. | 40/660 |
| 1,385,627 A * | 7/1921 | Lane | ............................. | 43/42.53 |
| 1,600,653 A * | 9/1926 | Steenstrup | .................... | 43/42.09 |
| 1,740,335 A * | 12/1929 | Cowan | .......................... | 43/42.09 |
| 1,776,090 A * | 9/1930 | Shroyer | ........................ | 43/42.09 |
| 1,968,209 A * | 7/1934 | Irby | ............................. | 40/607.13 |
| 2,012,420 A * | 8/1935 | Day | ................................ | 40/1.5 |
| 2,145,296 A * | 1/1939 | Draper et al. | ................... | 40/1.5 |
| 2,156,553 A * | 5/1939 | Vendope | ......................... | 40/660 |

(Continued)

FOREIGN PATENT DOCUMENTS

| JP | 2000218999 A | * | 8/2000 | ............. | A01K 85/00 |
|---|---|---|---|---|---|
| JP | 2003210074 A | * | 7/2003 | ............. | A01K 85/00 |

(Continued)

OTHER PUBLICATIONS https://www.merriam-webster.com/dictionary/monolithic (last visited May 27, 2022).*

(Continued)

*Primary Examiner* — Darren W Ark

(57) ABSTRACT

Web-mounting fishing plug has a body with a slot or aperture into which a web can be inserted. The web, for example, a photo, postage stamp, or transparent colored sheet, may be inserted into the slot or aperture. A closure may attached to the body, which may cover the slot or aperture and protect the web from moisture. Provision for light-emission, coloration, pattern, an increase or decrease in mass, hence, density, movement, smell, sound, and so forth may be supplied. Hook(s) and/or other accessory(ies) may be attached. The invention can be provided in kit form so that the web of one's choosing, light, color, etc., may be employed with the plug.

20 Claims, 2 Drawing Sheets

(56) References Cited

U.S. PATENT DOCUMENTS

| | | | |
|---|---|---|---|
| 2,213,449 A * | 9/1940 | Mungen | 40/1.5 |
| 2,232,060 A * | 2/1941 | Foster | 40/1.5 |
| 2,297,285 A * | 9/1942 | Bledsoe | 40/661 |
| 2,309,521 A * | 1/1943 | Mabee | 43/42.33 |
| 2,360,815 A * | 10/1944 | Mungen | 40/1.5 |
| 2,529,642 A * | 11/1950 | Vaughn et al. | 43/42.32 |
| 2,540,221 A * | 2/1951 | Ten Hoeve et al. | 40/661 |
| 2,540,718 A * | 2/1951 | Duskin | 40/651 |
| 2,548,706 A * | 4/1951 | Corning | 40/661 |
| 2,573,592 A * | 10/1951 | Nickel | 43/42.33 |
| 2,594,673 A * | 4/1952 | Nichols | 43/42.33 |
| 2,599,035 A * | 6/1952 | Wing | 43/42.33 |
| 2,665,511 A * | 1/1954 | Bradberry | 43/42.33 |
| 2,670,559 A * | 3/1954 | Webb et al. | 43/42.33 |
| 2,670,560 A * | 3/1954 | Matras | 43/44.87 |
| 2,677,901 A * | 5/1954 | Tilleman | 40/660 |
| 2,733,535 A * | 2/1956 | Rosen | 43/42.33 |
| 2,740,220 A * | 4/1956 | Caplan | 43/42.34 |
| 2,754,610 A * | 7/1956 | Carlson | 43/17.6 |
| 2,796,693 A * | 6/1957 | Gunterman | 43/42.32 |
| 2,834,141 A * | 5/1958 | Quyle | 43/42.32 |
| 2,951,308 A * | 9/1960 | Kent | 43/42.33 |
| 2,996,826 A * | 8/1961 | Lamar | 43/42.32 |
| 3,040,462 A * | 6/1962 | Guida | 43/17.6 |
| 3,069,801 A * | 12/1962 | Mills | 43/42.33 |
| 3,210,882 A * | 10/1965 | Purdom | 43/42.33 |
| 3,281,978 A * | 11/1966 | Drugan et al. | 40/308 |
| 3,360,882 A * | 1/1968 | Belokin, Jr. | 43/42.33 |
| 3,392,474 A * | 7/1968 | De Weese | 43/42.32 |
| 3,407,523 A * | 10/1968 | Winston | 40/1.5 |
| 3,408,764 A * | 11/1968 | McCurry | 43/42.33 |
| 3,423,868 A * | 1/1969 | Le Master | 43/42.33 |
| 3,505,754 A * | 4/1970 | Lawlor | 43/42.33 |
| 3,528,189 A * | 9/1970 | Lilley, Jr. | 43/42.33 |
| 3,540,144 A * | 11/1970 | Gurka | 43/42.33 |
| 3,631,625 A * | 1/1972 | Castner | 43/42.33 |
| 3,708,903 A * | 1/1973 | Bercz et al. | 43/42.33 |
| 3,762,092 A * | 10/1973 | Bercz et al. | 43/42.09 |
| 3,834,058 A * | 9/1974 | Gaunt | 43/42.32 |
| 3,902,266 A * | 9/1975 | Howard | 43/42.32 |
| 3,940,869 A * | 3/1976 | Roberts | 43/42.34 |
| 3,947,989 A * | 4/1976 | Bart | 43/42.33 |
| 3,969,836 A * | 7/1976 | DuBois | 40/665 |
| 4,177,587 A * | 12/1979 | Dorsen et al. | 40/649 |
| 4,208,823 A * | 6/1980 | Hershberger | 43/42.09 |
| 4,249,330 A * | 2/1981 | Chioffe | 63/18 |
| 4,408,406 A * | 10/1983 | Barton | 40/660 |
| 4,429,482 A * | 2/1984 | Honse | 43/42.32 |
| 4,464,857 A * | 8/1984 | Olszewski | 43/42.33 |
| 4,594,802 A * | 6/1986 | Field | 40/661 |
| 4,637,160 A * | 1/1987 | Biskup | 43/42.33 |
| 4,638,584 A * | 1/1987 | Lindsay | 43/42.33 |
| 4,700,504 A * | 10/1987 | Mattison | 43/42.33 |
| 4,704,770 A * | 11/1987 | Minami et al. | 40/661 |
| 4,726,469 A * | 2/1988 | Farber | 206/776 |
| 4,741,120 A * | 5/1988 | Cota et al. | 43/42.33 |
| 4,803,793 A * | 2/1989 | Schellenberg, III | 43/42.33 |
| 4,823,497 A * | 4/1989 | Pierce | 43/17.6 |
| 4,831,765 A * | 5/1989 | Bradshaw | 43/42.32 |
| 4,866,952 A * | 9/1989 | Hight et al. | 63/18 |
| 4,881,340 A * | 11/1989 | Davis | 43/42.32 |
| 4,889,748 A * | 12/1989 | Dudley | 40/661 |
| 5,036,617 A * | 8/1991 | Waldrip | 43/42.33 |
| 5,044,110 A * | 9/1991 | Henderson et al. | 43/42.33 |
| 5,077,930 A * | 1/1992 | Berry | 43/42.32 |
| 5,131,182 A * | 7/1992 | Ising | 43/42.33 |
| 5,299,107 A * | 3/1994 | Ratcliffe et al. | 43/17.6 |
| 5,355,613 A * | 10/1994 | Kechriotis | 43/42.33 |
| 5,487,203 A * | 1/1996 | Brach et al. | 40/661 |
| 5,638,631 A * | 6/1997 | Guerri et al. | 43/42.33 |
| 5,678,349 A * | 10/1997 | Pacora | 43/42.33 |
| 5,810,372 A * | 9/1998 | Arendt | 40/308 |
| 5,890,308 A * | 4/1999 | Harrington | 40/661 |
| 5,933,994 A * | 8/1999 | Misaresh | 40/661 |
| 6,009,653 A * | 1/2000 | Harrington | 40/661 |
| 6,010,000 A * | 1/2000 | Tran | 206/776 |
| 6,029,388 A * | 2/2000 | Yokogawa et al. | 43/17.6 |
| 6,058,645 A * | 5/2000 | Lummis | 43/42.33 |
| 6,092,658 A * | 7/2000 | Pietrafesa | 206/776 |
| 6,202,337 B1 * | 3/2001 | Yoshida | 43/42.33 |
| 6,212,809 B1 * | 4/2001 | Gaule | 40/661 |
| 6,276,877 B1 * | 8/2001 | Crawford | 40/661 |
| 6,345,458 B1 * | 2/2002 | Garibian | 40/506 |
| 6,366,401 B1 * | 4/2002 | Gonda et al. | 206/776 |
| 6,510,646 B1 * | 1/2003 | Kechriotis | 43/42.33 |
| 6,718,675 B1 * | 4/2004 | Lu | 40/661 |
| 6,986,220 B2 * | 1/2006 | Kaulbach | 40/660 |
| 7,096,625 B1 * | 8/2006 | Hering | 49/46 |
| 7,454,819 B2 * | 11/2008 | Wu | 24/429 |
| 7,845,104 B1 * | 12/2010 | Holzapfel | 40/660 |
| 9,078,420 B1 * | 7/2015 | Rudy | A01K 85/00 |
| 2001/0054245 A1* | 12/2001 | Williams | 40/661 |
| 2006/0032109 A1* | 2/2006 | Chiodo | 43/42.09 |
| 2007/0199233 A1* | 8/2007 | Higgin | 43/42.32 |
| 2008/0104880 A1* | 5/2008 | Hegemier et al. | 43/42.32 |

FOREIGN PATENT DOCUMENTS

| | | | | |
|---|---|---|---|---|
| JP | 2003299425 A | * | 10/2003 | A01K 85/00 |
| JP | 2003325080 A | * | 11/2003 | A01K 85/00 |
| JP | 2004024226 A | * | 1/2004 | A01K 85/00 |
| JP | 2007312765 A | * | 12/2007 | A01K 85/00 |
| JP | 2008283876 A | * | 11/2008 | A01K 85/00 |
| WO | WO 2005115137 A1 | * | 12/2005 | A01K 85/00 |

OTHER PUBLICATIONS

Rudy, U.S. Appl. No. 60/355,031, filed Feb. 8, 2002.
Rudy, U.S. Appl. No. 29/004,834, filed Jan. 13, 1993.
Rudy, U.S. Appl. No. 60/001,460, filed Jul. 17, 1995.
Rudy, U.S. Appl. No. 08/486,900, filed Jun. 7, 1995.
Rudy, U.S. Appl. No. 08/683,105, filed Jul. 16, 1996.
Rudy, U.S. Appl. No. 60/182,387, filed Feb. 14, 2000.
Rudy, U.S. disclosure document No. 411,880 filed Jan. 13, 1997.
Mish et al. (Eds.), Webster's Ninth New Collegiate Dictionary, Merriam-Webster Inc., Springfield, Mass., 1984, p. 1539.
Mish et al. (Eds.), Webster's Ninth New Collegiate Dictionary, Merriam-Webster Inc., Springfield, Mass., U.S.A., 1984, p. 905.
Wikipedia, "Plug (fishing)," https://en.wikipedia.org, revision of Jan. 16, 2013, printed May 30, 2018, 3 pages.

* cited by examiner

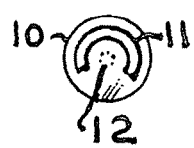
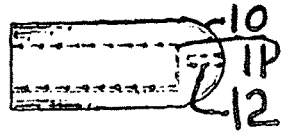
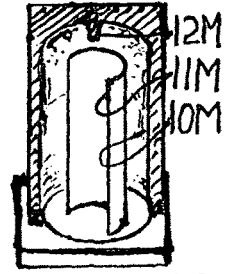
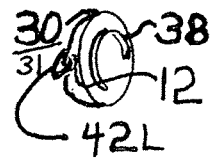
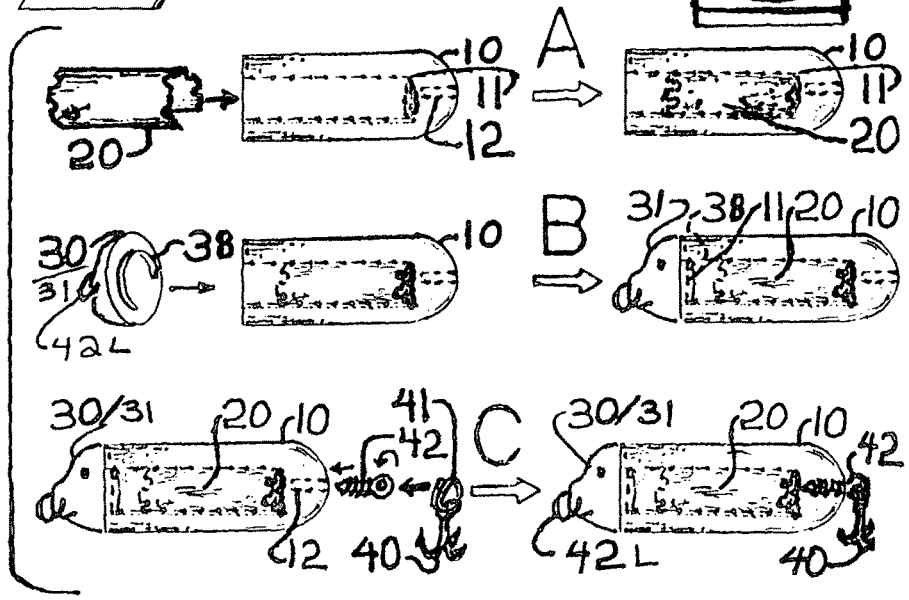
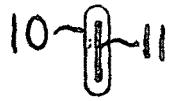
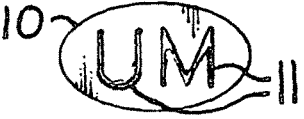
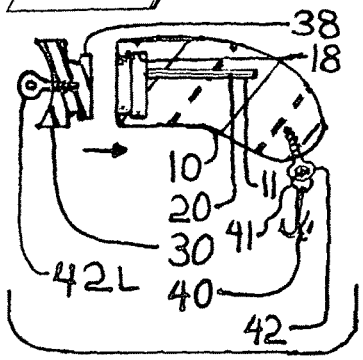
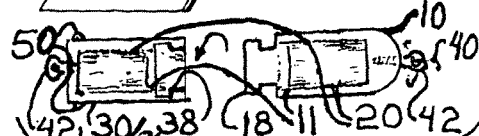
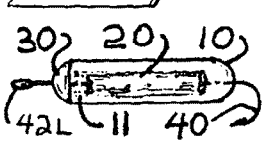
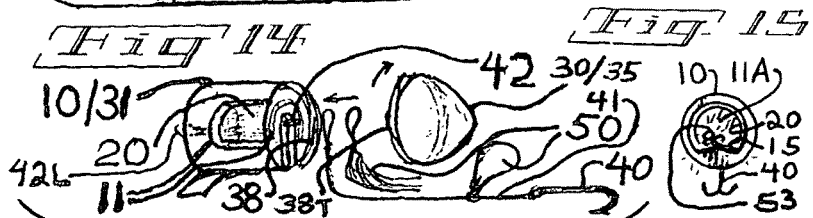

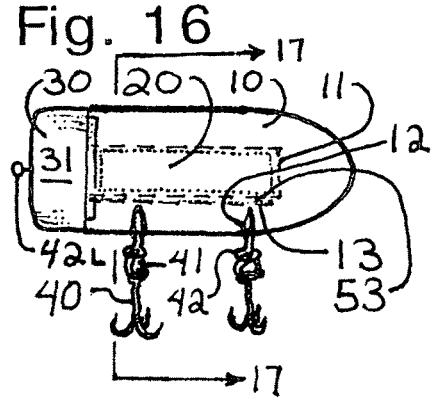
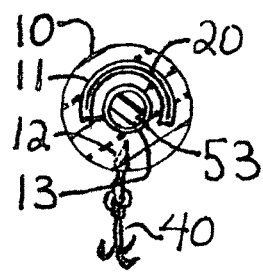
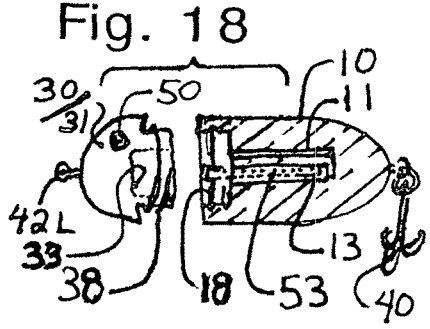
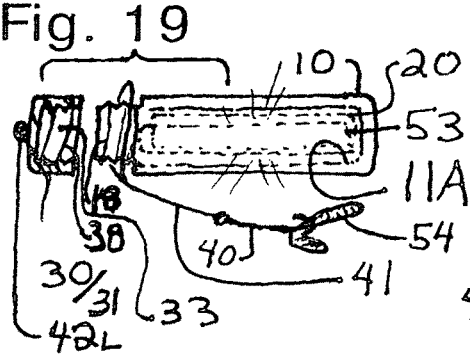
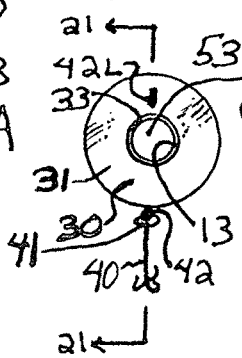
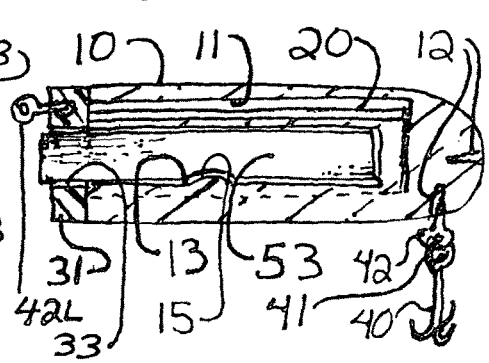
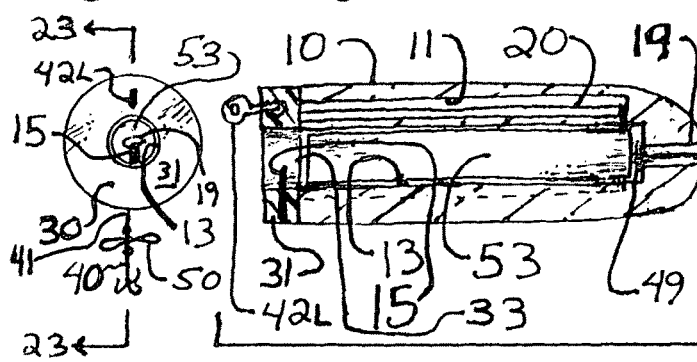
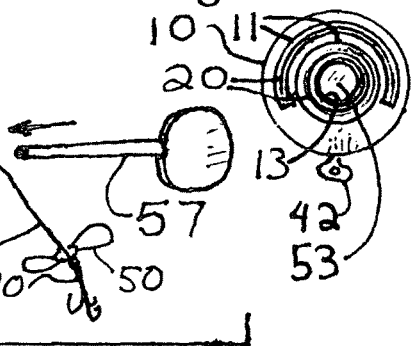
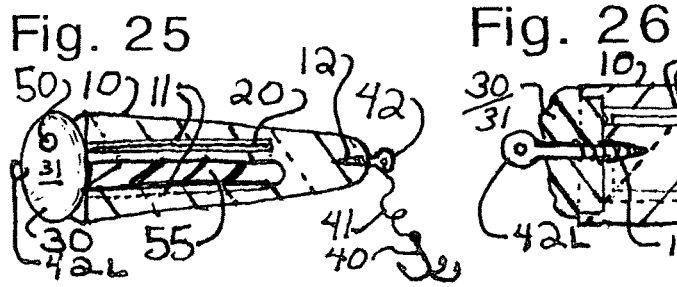
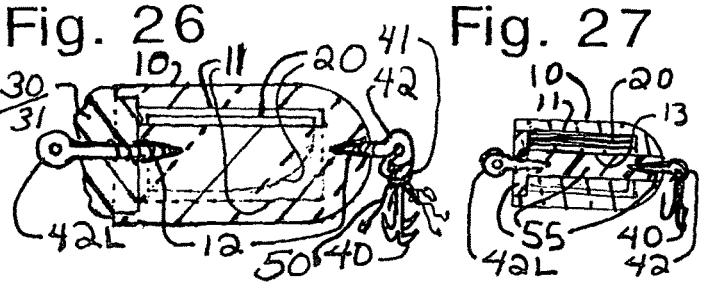
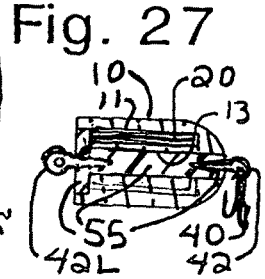

STAMP/WEB-MOUNTING FISHING TACKLE

This claims benefit under 35 USC 119(e) of U.S. provisional patent application No. 60/355,031 filed on Feb. 8, 2002 A. D. The specification of that application is incorporated herein by reference in its entirety, i.e., that specification is IHBRIIE.

FIELD

This invention concerns a fishing plug, especially one into which a web and optionally an insert of another form or type can be or has been inserted. It may be provided in kit form.

BACKGROUND

Rudy, in U.S. patent application Ser. Nos. 29/004,834, 60/001,460, 08/486,900 and 08/683,105, each specification IHBRIIE, discloses a stamp-mounting fishing lure, a fishing lure and other tackle with web, stamp-mounting fishing tackle, and stamp/web-mounting fishing tackle. In the latter three, a fishing plug is disclosed in which the stamp or other web is mounted as in a horseshoe-type arrangement as by embedding the stamp or web in liquid plastic.

It would be desirable to improve upon the same.

It would be further desirable to improve upon other plugs.

SUMMARY

In general, provided hereby is a web-mounting fishing plug comprising a body having a slot or aperture into which a web can be inserted; preferably, inserted into the slot or aperture, the web; and, preferably, attached to the body, a closure, which may cover the slot or aperture and protect the web. Provision for light-emission; coloration; pattern; variability in in mass, thus density; movement; smell; sound; and so forth, may be supplied. Hook(s) and/or other accessory(ies) may be attached. The plug body itself, the closure itself, and the plug body and closure subcombination may be considered as separate embodiments of the invention. The invention can be provided in kit form so that the web or insert of one's choosing may be employed with the plug.

The plug is useful as an amusement and in fishing.

Significantly, by the invention, a web/mounting fishing plug is provided which is readily adaptable for conveniently mounting a web from a wide variety of webs. Thus, the plug of the present invention can be customized to contain a web that is attractive to the fisherman and/or the fish. A leader can be attached to the plug to hold a hook, and a replaceable trailing item may be attached as well. In another embodiment, an insert, for example, a source of light, may be added. The plug is well adapted for ready assembly in an industrial or home environment.

Numerous further advantages attend the invention.

DRAWINGS

The drawings form part of the specification hereof. With respect to the drawing figures, which are not necessarily drawn to scale, the following is briefly noted:

FIG. 1 is front view of a plug body of the invention.

FIG. 2 is a rear view of the body of FIG. 1.

FIG. 3 is a side view of the body of FIGS. 1 & 2.

FIG. 4 a perspective view of a mold from which the body of FIGS. 1-3 may be made.

FIG. 5 is a perspective view of a closure head of the invention for attachment to the plug of FIGS. 1-3.

FIG. 6 is a schematic plan view of assembly of a plug of the invention in three steps, A, B and C, which employs the body of FIGS. 1-3, the head of FIG. 5, a web, and hooking tackle.

FIG. 7 is a front view of another plug body of the invention, with a planar web-receiving slot and a flattened body.

FIG. 8 is a front view of another plug body of the invention, with a an X-shaped web-receiving slot and having a body with a generally rectangular cross-sectional shape.

FIG. 9 is a front view of another plug body of the invention, with a circular web-receiving slot and having a body with a generally hexagonal cross-sectional shape.

FIG. 10 is a front view of another plug body of the invention, with a plurality of web-receiving slots, one of which happens to be U-shaped and one M-shaped, and having a body with a generally elliptical cross-sectional shape.

FIG. 11 is an exploded, sectional view of another embodiment of the invention, a snap-together type.

FIG. 12 is a top, exploded view of another embodiment of the invention, a slip-in tab and slot type, further which illustrates plural, web-containing component sections.

FIG. 13 is a side view of another plug body of the invention, with a hook shaft traversing the plug body lengthwise, further which illustrates a glue and/or putty type head closure.

FIG. 14 is a rear perspective view of another embodiment of the invention, a screw-in type, further which illustrates a head-body for holding the web, and a rear closure.

FIG. 15 is a front view of another plug body of the invention having an aperture rather than a mere slot in its body.

FIG. 16 is a side view of another plug of the invention, which has a slot for a web as well as a cavity for an insert.

FIG. 17 is a sectional view from a front position of the body of the plug of FIG. 16, taken along 17-17 in FIG. 16.

FIG. 18 is side, exploded view of a plug of the invention with its head in plan and its body in section, which has a cavity for an insert in addition to a slot for a web.

FIG. 19 is a side, exploded view of a plug of the invention with its head in section and its body in plan, which has an aperture for a web and other components such as an insert.

FIG. 20 is a front view of another plug of the invention, which has an annular head, and a cavity for an insert.

FIG. 21 is a sectional view from a side position of the plug of FIG. 20, taken along 21-21 in FIG. 20.

FIG. 22 is a front view of another plug of the invention, which also has an annular head, and a cavity for an insert.

FIG. 23 is a sectional view from a side position of the plug of FIG. 22, taken along 23-23 in FIG. 22, the plug being illustrated along with an insert-unloading key.

FIG. 24 is a front view of another plug body of the invention, with a horseshoe-shaped web-receiving slot, a circular web-receiving slot, and a cavity for an insert.

FIG. 25 is a side view of another plug of the invention, its head in elevation and its body in section, showing a permanent insert in the body.

FIG. 26 is a side, sectional view of another plug of the invention having its line-attaching feature embedded in its body.

FIG. 27 is a side, sectional view of another plug of the invention with a permanent insert that closes the web and into which is mounted tackle.

ILLUSTRATIVE DETAIL

The invention can be further understood by the present detail, which may be read in view of the drawings. Such is to be taken in an illustrative, and not necessarily limiting, sense.

With reference to the drawings, the web-mounting fishing plug of the invention, in general, may include such parts as body(ies) 10, web(s) 20 and end(s) 30, and such components as hook(s) 40 and/or additional component(s) 50, taken as groups. The following table lists numbered features of the invention:

| Feature | Comment |
| --- | --- |
| 10 | Body. |
| 10M | Mold cup for forming body. |
| 11, 11A | Slot or aperture, notably for a web. |
| 11M | Mold fin for forming slot for web. |
| 12 | Component-receiving starter hole. |
| 12M | Mold pin for forming starter hole. |
| 13 | Insert-receiving cavity. |
| 15 | Web- or insert-restraining auxiliary member. |
| 18 | Part-attaching device or feature on body. |
| 19 | Insert-unloading/line-feeding channel. |
| 20 | Web. |
| 30 | End. |
| 31 | Head end |
| 33 | Insert-accommodating opening or cavity in head. |
| 35 | Tail end. |
| 38 | Part-attaching device or feature on head. |
| 38T | Part-attaching device or feature on tail. |
| 40 | Hook. |
| 41 | Intermediate tackle item to help attach hook. |
| 42 | Hook-attaching member. |
| 42L | Line-attaching member. |
| 49 | Line-restraining contrivance. |
| 50 | Additional component. |
| 53 | Insert, re/movable, say, for color, electricity, light, mass, movement, pattern, smell, sound, etc. |
| 54 | Bait on hook. |
| 55 | Insert, fixed, say, for color, light, etc. |
| 57 | Insert-unloading key. |

The body 10 can be generally solid and have the slot 11 into which the web 20 can be inserted. One slot 11 may be provided for insertion of one or more web(s) 20 per plug (FIGS. 1-3, 6, 7, 9, 13, 14, 16-18, 21, 23, 25-27). More than one slot 11 may be present for insertion of one or more web(s) 20 per plug (FIGS. 8, 10, 12, 24). Aperture 11A may replace the slot to form a more hollowed out body 10 (FIGS. 15, 19) which may more readily float, perhaps having web-restraining auxiliary body (FIG. 15), and one or more web(s) 20 may be placed into the aperture 11A. The slot 11 may be found in the end 30 of the plug, for example, in the head 31 (FIGS. 12, 14). Beneficially, the body 10 or end 30 part having slot(s) 11 or aperture(s) 11A for the web(s) 20 is light-transmissive so that the web(s) 20 may be viewed after having been inserted therein. Preferably, the light-transmissive quality is that of transparency, at least essentially, versus that of translucence. The body 10 or end 30 part may be provided with regions of transparency, translucency, or even opacity, in contrast to other regions that are not of the same quality with respect to the transmittance or lack of transmittance of light.

As a fishing plug, it is advantageous to provide for line attachment with a line-attaching member 42L such as, for example, attached through receiving hole 12 say, present perpendicular to an axis of expected pull of the lure through the water for a slip ring in the head 31 (FIGS. 5, 6) or through which line may simply be threaded; say, generally parallel to the axis of expected pull for a screw-in eyebolt in what may be considered to be the head 30/31 (FIGS. 11, 12, 14, 16, 18-23, 25); or, say, a front portion of the plug body 10 (FIGS. 13, 14, 26), which may be a body 10 with or without a plainly noticeable head, so that the plug may be cast and retrieved in fishing. A hook 40 may provide for the line-attaching feature member 42L such as through its own eye (FIG. 13). Also, it may be highly desirable to attach the hook 40, which may have intermediate tackle item 41 such as slip ring (FIGS. 6, 11, 16-18, 20, 21, 26) or leader (FIGS. 14, 19, 22, 23, 25) and/or other intermediate tackle item as may be desired such as bounder(s), swivel(s), spreader(s), spring(s), and so forth and the like, to the plug by provision of a hook-attaching member 42 such as, for example, attached through receiving hole 12 in the rear of the plug (FIGS. 1-3, 6, 11, 12, 18, 21, 25, 26) and/or in the expected bottom of the plug (FIGS. 16, 17, 20, 21, 24), and so forth and the like—into which a hole 12 may be provided for the hook-attaching member 42 such as, for example, a screw-in eyebolt (FIGS. 6, 11, 12, 16-18, 20, 21, 24-26). The members 42, 42L may be embedded in curing resin in an open-ended channel 13, for example, in a fixed insert 55 (FIG. 27). Use of a light weight leader from the member 42 to hook 40 (FIGS. 14, 19, 22, 23, 25) may save the plug from being lost when snagged as well as provide more action for a hook, which may hold bait 54 such as a worm (FIG. 19) or may be baited with other bait such as a doughball, a kernel of corn, a minnow, a piece of meat, or not, as may be desired. The member 42 may be in the form of a pin (FIG. 14) onto which a leader 41, which may include a spoon as an optional, additional component 50 and/or onto which may be hung additional component(s) 50, say, a trailing item such as a skirt, feathers, colored lines, light metal chains, threads or filaments having absorbed fish-attracting substances (which may be changed or refreshed readily as may be desired) and so forth; the leader 41 and trailing item 50 are secured by employing the rear cap 45. An insert-unloading/line-feeding channel 19 may be in the rear of the body 10 leading to the insert-receiving cavity 13 (FIG. 23); with this, in particular as concerns attachment of the hook 40, a line-restraining contrivance 49 such as a knot, a button, or a piece of attached split shot can serve to keep the leader 41 and hook 40 attached to the plug, especially if an insert 53 is in the cavity 13. Other devices serving as the line-attaching member may be employed such as gluing, taping, harnessing with line, directly screwing without a provision of a starter or receiving hole, and fixing by friction or pressure between parts or components such as between the body 10 and head 31 (FIG. 19), a body and tail, a cavity wall and removable insert, and so on.

Other additional components 50 may be employed such as eyes (FIGS. 12, 18, 25), spoons (FIG. 14), propellers (FIGS. 22, 23); beads, taped features, sequins in a plastic matrix of a body, head or tail, and so forth. An insert 53 such as an internal additional component of rattling and/or glowing beads (FIG. 15) may be employed. The insert 53 may fit closely in the aperture 11A or insert-receiving cavity 13, which may be closed-ended (FIGS. 15-21, 24, 25), open-ended (FIG. 27) or partially closed with a rear shoulder (FIGS. 22, 23) and so forth, and may be restrained from removal from the cavity 13 during fishing by the closed end or shoulder, especially during casting as centrifugal force will help keep the insert 53 in place, by friction between walls of the cavity 13 and insert 53, by restraint from the head 31 (FIGS. 16, 18, 19), by an insert-restraining auxiliary member 15, say, in the form of a bump (FIG. 21) or a removable peg or pin (FIGS. 22, 23), and/or by other devices such as those in the form of a spring, corresponding screw threads on an insert and insert-receiving cavity, a light duty or removable glue, and so forth and the like. The insert 53 can provide for changes in color such as by having available a series of inserts, each of a different color, say, one each of red, orange, yellow, violet and black; emission of electricity or magnetism; emission of visible and/or other light such as powered by battery, or, preferably, by employment of a luminous, desirably phosphorescent, insert, which can be made to include luminescent matter as in a uniformly mixed plastic or through painting which glows after exposure to light, or made by chemiluminescence as by using a chemiluminescent stick or cartridge, and with such light-emitting inserts emitting light in a color as may be desired, say, red, yellow, orange, green, blue, indigo, violet or white; changes to the mass of the plug through use of inserts of various weights so as to increase or decrease the mass of the plug, and hence, its density so that the plug can be controlled in buoyancy or submergibility; movement, as by employment of a vibrating or rocking insert, or by movable beads; pattern of lines, colors, and so forth, say, to resemble those of a desired bait creature; smell, say, by insert of a solid, salty or fizzing insert, of a solid meat insert such as muscle tissue or organs to include liver, of a plastic impregnated with oil and/or protein, of a semisolid substance such as peanut butter, which may exude from the channel 19 in imitation of a defecating or injured bait creature during a hard retrieve, and so forth; sound such as by insert of hard beads and/or an electronic unit that can emit sound waves that may attract fish; and so forth. When a channel is present to an aperture or cavity such as the channel 19 leading to the cavity 13 (FIGS. 22, 23) an insert 53 may be removed by employing the insert-unloading key 57, or by a simple nail, probe, stick or toothpick, typically after removal of any restraining member such as the pin 15. The key 57 may also remove the hook 40 by the leader 41 having the knot 49.

Light-transmissive component(s) of the plug may be made with a suitable glass or plastic material, say, for instance, a clear polycarbonate, polymethylmethacrylate, Lexan, other see-through plastic known in the art for making fishing plugs, and so forth and the like. Casting or molding may be employed, for instance, such as for a simple plug body (FIGS. 1-3) with a two-piece cavity mold having body cup 10M, web slot forming fin 11M, and starter hole forming pin 12M (FIG. 4). Of course, these and other parts and features of the plug can be provided by different or more complex molds. Resort may be had to alternative methods of providing the plug or parts or features thereof such as by drilling, milling and so forth and the like. Light-transmissive parts may be transparent or translucent such as by employment of suitable materials, which may be colorless or colored, say, rose, pale orange, yellow, blue, green, or purple, so as to enhance appeal to fish and/or fishermen, and/or enhance the aesthetic appeal of the web(s) 20 and/or insert(s) 53, 55.

The fixed insert 55 may be a separate insert otherwise much like a removable insert 53 but permanently residing in the plug, for example, in its body 10 (FIGS. 25, 27), such as by employment of permanent glue, or casting a resin in the cavity 13. As such, the fixed insert 55 could have capacities for color, electricity, light, mass, internal movement, pattern, smell, sound, and so forth, especially different from that of the surrounding material of the plug. Preferably, the fixed insert 55 is of a material that can provide for emission of light such as by luminescence, say, phosphorescence, which may provide a permanent, rechargeable light-emission source in the plug. Alternatively, the fixed insert 55 may be simultaneously molded with the remaining portion of the plug, but of a different material, say, of a different color than its surroundings, or of a luminescent material to provide a vein of luminescence in the plug, say, in the body 10.

The plug or any part of it may be uniformly luminescent. For example, the plug body 10 may be phosphorescent throughout.

The web 20 can be virtually any suitable material, and it may contain or be provided with decoration, drawing, indicia and so forth and the like to enhance its appeal to the fisherman and perhaps even the fish. The web 20 can be opaque, translucent, or transparent, have part opaque and another part light-transmissive and so forth. The web 20, for example, can be a postage or other stamp; a postal or other franking; a photograph or picture, say, a portrait of a person or group of persons; a piece of paper with an autograph; a cartoon drawing; a piece of shiny wrapping paper or metal foil; a transparent and/or translucent sheet of colored plastic; material cut in a shape of an insect wing. Among these are noted the stamp, as the invention can combine fishing with stamp-collecting, perhaps the world's favorite outdoor and indoor recreations, and this in a versatile manner; the photograph, as the invention can provide for interchangeable employment of many depictions that amuse people and perhaps even attract fish; and the colored sheet of light-transmissive plastic material, as it can readily change the presentation of the plug, particularly when the plug has provision for the emission of light. The web 20 may contain identifying indicia such as the name of a person, place or thing, a mark identifying goods or services, printed matter, and so forth. One of the attractive, advantageous features of the invention, especially when provided in kit form is that the fisherman can provide his own web 20, say, a photo of himself, a brother or a friend holding a trophy walleye; a favorite postage, tax or trading stamp; a colorful cartoon; a business card; a fishing license, new or old; a dollar bill; a piece of Christmas gift wrapping paper; sheet(s) of plastic which is(are) light-transmissive and/or of foil; and so on. A kit may contain a selection for the web 20 such as a sheet with logos of popular professional sports teams, universities and/or consumer goods. It may be in the form of a two-sided decoration, drawing or indicia such as two postage stamps pasted together with the illustrations facing away from one another, be plain on one side, or be backed with a shiny material such as metal foil or tape. In the latter case, a sheet of reflective material may cover one side of a non-shiny web to face toward the outside of the body 10 or face inwardly as the slot 11 or aperture 11A may permit. The web 20 thus may be paper-, plastic- and/or metal-based. It may otherwise be of a plant material, say, a preserved rose petal, or an animal material, say, a preserved, pressed fish or frog.

In general, a closure is attached to the web-containing part 10, 30 so as to cover the slot 11 and/or aperture 11A and protect the web 20 from moisture, particularly if the web 20 would otherwise be susceptible to damage by water during fishing. The closure may be by a simple expedient of covering a slot with water-repellent or water-proof glue, caulk, putty or resin, which may, although a head is not required (FIG. 27), provide head end 30 or head 31 for the plug (FIGS. 13, 26). The closure may be provided by closure or attachment devices provided as structural features of plug components (FIGS. 6, 11, 12, 14, 16-23, 25) by themselves or in addition to use of glue, caulk, putty or resin. Use of a water-repellent or water-proof glue in conjunction with such closure or attachment devices can be beneficially employed.

Parts such as the bodies 10 and ends 30 to include heads 31 and tails 35 may be attached in any suitable manner, and devices for this can be provided with the plug. For example, simply gluing or taping components together with a water-repellent or water-proof glue or tape, may suffice for the attachment. Generally, it is desirable to protect the web 20, particularly if it is susceptible to water damage; hence, glue is preferably water-repellant or water-proof. Part-attaching devices or features 18, 38, 38T can enhance the attachment. This may be by employment of a slot-insertion ridge, for example, the ridge 38 for insertion into the slot 11 (FIGS. 5, 6); a female-male, snap-together type arrangement 18, 38 between the parts, for example, a body 10 and head 30 (FIG. 11); a male-female 18, 38 slip-in tab and slot type arrangement between the parts, for example, a body 10 and head 30 (FIG. 12); a female-male 38, 38T screw-together threaded type arrangement between parts, for example, a body/head 10/31 and tail 30/35 (FIG. 14); pressure between the body 10 and head end 30 (FIG. 16); and other threaded screw arrangements (FIGS. 18, 19). Gluing flat surfaces of the body 10 and closure end 30 can be employed (FIGS. 21, 23, 25).

To assemble a web-containing plug of the invention, methods known in the art, as well as those disclosed herein, may be employed. For example, a web 20 may be selected and inserted into the web-receiving slot 11 of a plug body 10; glue may be applied between opposing faces of the body 10 and a head 30, which may already contain a line-attaching eye 32, the head 30 attached to the body 10, and the glue allowed to cure; and accessories such as rear eye bolt 42, slip ring 41 and hook 40 may be attached. See, FIGS. 1-3, 5, 6. An expedient plug of the invention can be made with a small glass bottle, into the cap 30 of which is screwed an eyebolt 42L, into the body 10 of which is placed the web 20, and between the body 10 and cap 30 is looped a snelled hook. See, FIG. 19. These or other methods may be used. Compare, the foregoing description and FIGS. 7-18, 20-27.

CONCLUSION

The present invention is thus provided. Various features, parts, subcombinations or combinations may be practiced with or without reference to other features, parts, subcombinations and combinations in the practice of the invention, and numerous adaptations and modifications can be effected within its spirit, the literal claim scope of which is particularly pointed out as follows:

I claim:

1. A web-mounting fishing plug comprising a plug body of a solid material that at least in part can transmit light; and, in the plug body, a narrow slot essentially along a front to rear or rear to front direction—wherein:
    the plug body is present as one and only one plug body, which is monolithic, of a unibody construction, and consists of a single body component;
    the plug body is substantially thicker than the narrow slot;
    the narrow slot is:
        blind on one end from the plug body and open on an opposite end to the blind end such that from the open end to the blind end a first dimension is defined along a first direction;
        characterized in having a first wall having a linear and/or curved second dimension along a linear and/or curved second direction substantially perpendicular to the first direction and a second wall conforming in shape to that presented by the first wall by registering substantially therewith but spaced apart closely from the first wall to define a third dimension between the first and second walls such that the first dimension and the second dimension are both substantially greater than the third dimension; and
    the plug further comprises the following:
        the thin web inserted into the narrow slot;
        a closure attached to the plug body, which covers the narrow slot to protect the thin web from moisture when fishing with the plug;
        at least one eye for receiving fishing line associated with the plug body; and
        attached directly or indirectly to at least one of the plug body and the closure, at least one fishing hook.

2. The plug of claim 1, wherein the web is a photograph including a person, a postage stamp, a trading stamp, a tax stamp, a cartoon, a fishing license, a business card, paper currency, or a sheet including a logo.

3. The plug of claim 1, which further comprises the following:
    in the plug body, a cavity separate from the slot into which an insert additional to the thin web inserted into the narrow slot, which is selected from the group consisting of a sound-emitting insert, a light-emitting insert, a movement-providing insert, and a smell-emitting insert; and
    the insert additional to the thin web inserted into the narrow slot.

4. A kit from which a web-mounting fishing plug can be assembled in a home environment, which comprises, in kit form:
    one and only one plug body, wherein the one and only one plug body is of a solid material that at least in part can transmit light and that has a narrow slot into which a thin web can be inserted essentially from a front or rear direction, and, when inserted, the thin web is visible from outside the plug body, the narrow slot having an opening at one end and being blind at an opposing end such that from the opening to the blind end a first dimension is defined along a first direction, which is front to rear or rear to front, and the narrow slot being further characterized in having a first wall having a linear and/or curved second dimension along a linear and/or curved second direction substantially perpendicular to the first direction and a second wall conforming in shape to that presented by the first wall by registering substantially therewith but spaced apart closely from the first wall to define a third dimension between the first and second walls such that the first dimension and the second dimension are both substantially greater than the third dimension, with the plug body being substantially thicker than the narrow slot; and wherein the one and only one plug body is monolithic, of a unibody construction, and consists of a single body component;
    at least one eye for receiving fishing line associated or for association with the one and only one plug body;
    a closure that can be attached to the one and only one plug body to cover the narrow slot, and protect it from moisture when fishing with a completed fishing plug; and
    attachable directly or indirectly to at least one of the one and only one plug body and the closure, at least one fishing hook—
such that the web-mounting fishing plug can be assembled therefrom in the home environment.

5. The kit of claim 4, which further contains in the one and only one plug body, in addition to and separate from the narrow slot:

a cavity into which an insert additional to the web can be placed; and at least one of the following:

the thin web, which is a removable and is selected from the group consisting of a postage stamp, a trading stamp, a tax stamp, a photograph including a person, a cartoon, a fishing license, a business card, paper currency, and a sheet including a logo; and the insert additional to the thin web for placement inside the cavity, wherein the insert additional to the web is removable and is selected from the group consisting of a sound-emitting insert, a light-emitting insert, a movement-providing insert, and a smell-emitting insert.

6. The kit of claim 4, wherein the closure can be attached to the one and only one plug body with inclusion of threading of the closure to the one and only one plug body through provision of threads on the closure itself corresponding to threads on the one and only one plug body itself.

7. A web-mounting fishing plug comprising a plug body of a solid material that at least in part can transmit light; and, in the plug body, a narrow slot essentially along a front to rear or rear to front direction—wherein:

the plug body is present as one and only QIN plug body, which is monolithic, of a unibody construction, and consists of a single body component;

the plug body is substantially thicker than the narrow slot;

the narrow slot is:

blind on one end from the plug body and open on an opposite end to the blind end such that from the open end to the blind end a first dimension is defined along a first direction;

characterized in having a first wall having a linear and/or curved second dimension along a linear and/or curved second direction substantially perpendicular to the first direction and a second wall conforming in shape to that presented by the first wall by registering substantially therewith but spaced apart closely from the first wall to define a third dimension between the first and second walls such that the first dimension and the second dimension are both substantially greater than the third dimension; and when viewed from a front or rear direction, selected from the group consisting of a form of a letter "I" and a flat, planar shape; and the plug further comprises the following:

the thin web inserted into the narrow slot;

a closure attached to the plug body, which covers the narrow slot to protect the thin web from moisture when fishing with the plug;

at least one eye for receiving fishing line associated with the plug body; and attached directly or indirectly to at least one of the plug body and the closure, at least one fishing hook.

8. A web-mounting fishing plug comprising a plug body of a solid material that at least in part can transmit light; and, in the plug body, a narrow slot essentially along a front to rear or rear to front direction—wherein:

the plug body is substantially thicker than the narrow slot;

the narrow slot is:

blind on one end from the plug body and open on an opposite end to the blind end such that from the open end to the blind end a first dimension is defined along a first direction;

characterized in having a first wall having a linear and/or curved second dimension along a linear and/or curved second direction substantially perpendicular to the first direction and a second wall conforming in shape to that presented by the first wall by registering substantially therewith but spaced apart closely from the first wall to define a third dimension between the first and second walls such that the first dimension and the second dimension are both substantially greater than the third dimension;

when viewed from a front or rear direction, selected from the group consisting of a form of a letter "C," a horseshoe, a letter "U," a truncated annulus, a letter "M," and a letter "X"; and such that a thin web can be inserted essentially therein from the front or rear direction, whichever end of the narrow slot is the open end, and, when inserted, the thin web is visible from outside the plug body; and the plug further comprises the following:

the thin web inserted into the narrow slot;

a closure attached to the plug body, which covers the narrow slot to protect the thin web from moisture when fishing with the plug;

at least one eye for receiving fishing line associated with the plug body; and attached directly or indirectly to at least one of the plug body and the closure, at least one fishing hook.

9. The plug of claim 8, wherein the web is a photograph including a person, a postage stamp, a trading stamp, a tax stamp, a cartoon, a fishing license, a business card, paper currency, or a sheet including a logo.

10. The plug of claim 8, wherein the narrow slot is one and only one in number, and in a shape of the letter "C," the horseshoe, the letter "U," or the truncated annulus, wherein the narrow slot extends about a semicircle or more when viewed from the front or rear direction.

11. The plug of claim 8, wherein the plug body is one and only one in number, to which is attached the at least one fishing hook, and the at least one eye for receiving fishing line.

12. The plug of claim 8, wherein the closure forms a head of the fishing plug.

13. The plug of claim 12, wherein the narrow slot is present in the head; and in the narrow slot in the head the thin web is present.

14. The plug of claim 8, wherein, in addition to the narrow slot, a cavity separate from the narrow slot is present, into which cavity an insert additional to the thin web can be inserted, wherein the insert additional to the thin web is selected from the group consisting of a sound-emitting insert, a light-emitting insert, a movement-providing insert, and a smell-emitting insert.

15. The plug of claim 14, wherein the narrow slot, in substantial part but not totally, when viewed from the front or rear direction, wraps around the cavity separate from the narrow slot.

16. The plug of claim 15, wherein the insert additional to the thin web includes at least one bead that can rattle in the cavity separate from the narrow slot.

17. The plug of claim 15, wherein the insert additional to the web has a solid exterior, and is luminous; and luminosity is provided through phosphorescence or chemiluminescence.

18. The plug of claim 8, wherein the narrow slot is in a shape of a letter selected from the group consisting of the letter "M" and the letter "X".

19. A kit from which a web-mounting fishing plug can be assembled in a home environment, which comprises, in kit form:

one and, only one plug body, wherein the one and only one plug body is of a solid material that at least impart can transmit light and that has a narrow slot into which a thin web can be inserted essentially from a front or rear direction, and, when inserted, the thin web is visible from outside the plug lady, the narrow slot having an owning at one end and being blind at an opposing end such that from the opening to the blind end a first dimension is defined along a first direction, which is front to rear or rear to front, and the narrow slot being further characterized in having a first wall having a linear and/or curved second dimension along a linear and/or curved second direction substantially perpendicular to the first direction and a second wall conforming in shape to that presented by the first wall by registering substantially therewith but spaced mart closely from the first wall to define a third dimension between the first and second walls such that the first dimension and the second dimension are both substantially greater than the third dimension, with the plug body being substantially thicker than the narrow slot; and wherein:

the narrow slot has a shape, when viewed from a front or rear direction, which is selected from the group consisting of a form of a letter "C," a horseshoe, a letter "U," a truncated annulus, a letter "M," a letter "X," a letter "I," and a flat, planar shape; and the one and only one plug body is monolithic, of a unibody construction, and consists of a single body component;

at least one eye for receiving fishing line associated or for association with the one and only one plug body;

a closure that can be attached to the one and only one plug body to cover the narrow slot, and protect it from moisture when fishing with a completed fishing plug; and attachable directly or indirectly to at least one of the one and only one plug body and the closure, at least one fishing hook— such that the web-mounting fishing plug can be assembled therefrom in the home environment.

20. The kit of claim 19, wherein the narrow slot is one and only one in number, and is in a shape of the letter "C," the horseshoe, the letter "U," or the truncated annulus, wherein the narrow slot extends about a semicircle or more when viewed from the front or rear direction.

* * * * *